March 28, 1961   C. VAN DER LELY ET AL   2,976,939
DEVICE FOR WEEDING WEEDS
Filed May 9, 1956
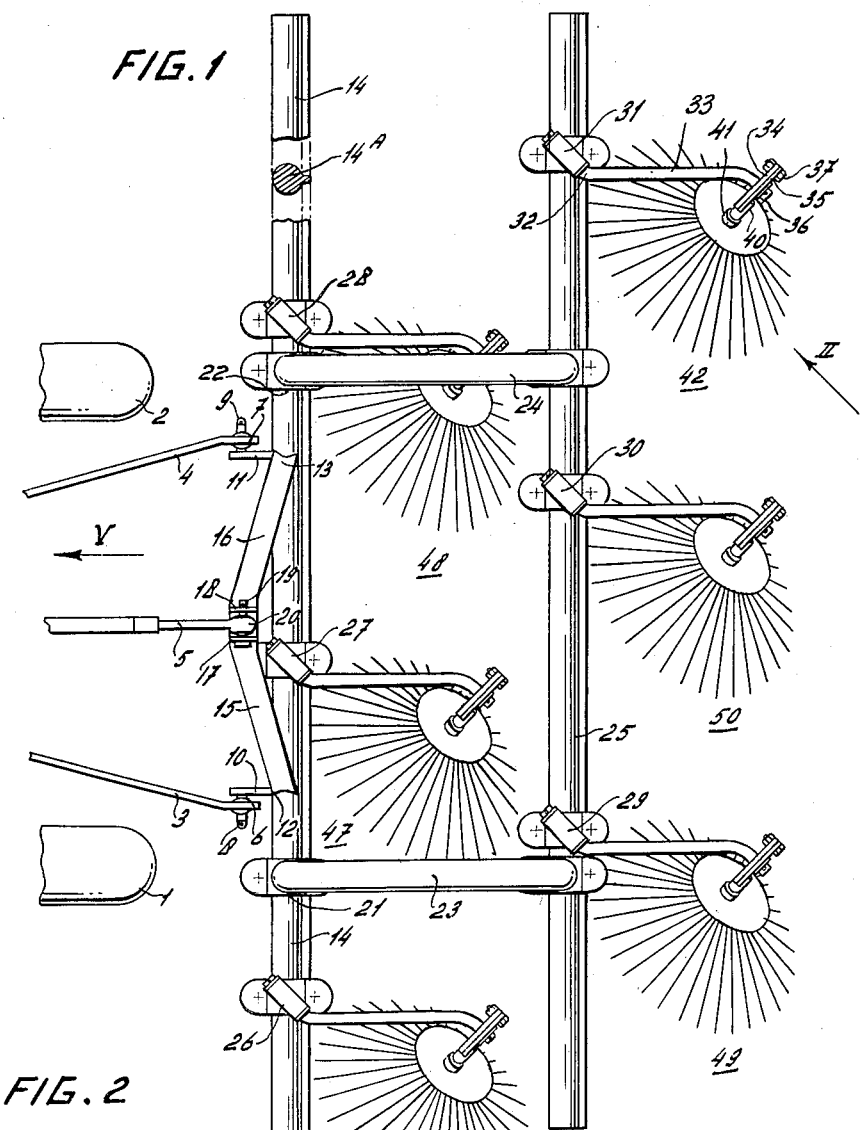
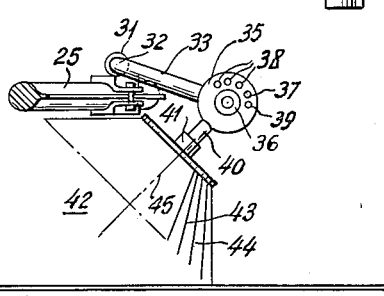

— # 2,976,939
DEVICE FOR WEEDING WEEDS

Cornelis van der Lely and Ary van der Lely, Maasland, Netherlands, assignors to C. van der Lely N.V., Maasland, Netherlands, a Dutch limited company Filed May 9, 1956, Ser. No. 583,685

Claims priority, application Netherlands May 11, 1955

1 Claim. (Cl. 172—522)

The invention relates to weeding devices.

It is an object of the present invention to provide a weeding device in which during forward movement of the device the weeding can take place in a way which harms as little as possible the young plants between which the weeding occurs. To that end according to the invention, the device is provided with at least one wheel having tines for turning over the upper layer of the soil, which wheel is freely rotatable about an axle making a substantial angle with the horizontal. As a result of said position of the wheel axle, every wheel has a substantial working width, so that small, light and cheap wheel constructions will suffice.

Other objects and advantages of the invention will become apparent from the accompanying drawing and the specification relative thereto.

In the drawing:

Fig. 1 is a plan elevational view of a device according to the invention and fixed to the lifting device of a tractor, Fig. 2 is a partial side view of a detail of the structure in Fig. 1.

In Fig. 1, the lifting device of a tractor, the hind-wheels 1 and 2 of which are partially visible, is composed of two bars 3 and 4 situated in a substantially horizontal plane and a bar 5 situated above said plane. The hindmost ends 6 and 7 of the bars 3 and 4 are connected to pins 8 and 9 which are attached to a beam 14 by means of strips 10 and 11 connected to said beam at 12 and 13. The beam 14 is made of a formed material having a section 14A. Also at 12 and 13 two bars 15 and 16 extending obliquely upwards in converging relation are mounted on the beam 14, the upper ends 17 and 18 of said bars 15 and 16 being attached to the rear end 20 of the bar 5 by means of a pin 19.

Two horizontal tubes 23 and 24 are connected to the beam 14 at points 21 and 22, which tubes carry a beam 25 in parallel to the beam 14. The beam 14 carries three bearings 26, 27 and 28, whereas the beam 25 carries three bearings 29, 30 and 31. The bearings 26-28 can be displaced along the beam 14 and the bearings 29-31 can be displaced along the beam 25. A horizontal axle of a crank is supported in each of said bearings. The axis of rotation 32 of a crank 33' for example is supported in the bearing 31. The free extremity of the crank 33 carries a disc 34, the plane of which is perpendicular to the center line of the axle 32. A second disc 35 (see also Fig. 2) of equal size rests against the disc 34, which disc 35 can be placed in a selected position with regard to the disc 34 by means of a central bolt 36, and a bolt 37 near the circumferences of the discs 34 and 35. In order to be able to place the disc also in various other positions, the disc 35 carries at its circumference a number of holes 38 and 39. The disc 35 is provided with a radial axle 40 on which the hub 41 of a weeding member 42 is connected so as to be freely rotatable. The active portion of the weeding member 42 is constituted by steel tines 43 and 44, and the points of said tines define a circle, the plane of which is perpendicular to the center line 45 of the axle 40. The tines constitute generating lines of a frustrum of a cone, the axis of which is the center line 45. The tines 43 and 44 are connected to the hub 41 in a resilient manner. In addition to the weeding member 42, five further weeding members 46, 47, 48, 49 and 50 are mounted in bearings 26, 27, 28, 29 and 30, respectively, in exactly the same way as the weeding member 42 is connected to the bearing 31. All cranks, weeding members and the fastenings between them have entirely the same construction as the crank 33 and the weeding member 42 and the connection between both said elements.

If the weeding device according to Figs. 1 and 2 travels across the land in the direction V, the weeding members will scrape with their lower tines along the ground while turning about their axles. The tines loosen the soil, due to which the newly-germinated weeds wither. If there are very young plants on the land which are not supposed to be damaged during said weeding, the lower tines of each weeding member are mounted so as to be in trailing relation by releasing the bolt 37 (Fig. 2), by turning the disc 35 until the hole 39 has reached the spot where the bolt 37 was located before and by remounting the bolt 37. As the plants grow, it will be possible to place the tines more upright, so that the position shown in Figs. 1 and 2 are ultimately used. Before the plants have grown too much to bear weeding with the device described, it will be possible to weed at least once more with the lower tines in a scooping position. For placing the tines in said position the hole 38 is moved adjacent the bolt 37. Naturally the position of the weeding member can also be adjusted to the kind of crop involved. The tines of the weeding members are resilient, and the cranks permit an adaptation of the weeding members to irregularities in the ground.

By displacing the bearings 26-28 on the beam 14, or the bearings 29-31 on the beam 25, the distance between the weeding members can be changed to permit an adaptation of the weeding members to the distance of the crop.

What we claim is:

A weeding device operative in a determinable direction of travel comprising a mobile frame, at least one freely rotatable weeding wheel adapted to be supported by said frame, tines on said wheel for rotation therewith, a crank on and connecting said wheel to said frame, said crank including an axle coupled to said wheel and defining a center line angularly disposed relative to the direction of travel, means on said frame defining an axis of rotation relative to said frame and supporting the crank in freely rotatable relation about said axis of rotation, the axis of rotation being perpendicular to a vertical plane through said center line, and being disposed at an acute angle relative to said direction, relatively movable discs for supporting the wheel on said crank, one of the discs being connected to the crank, and means for fixing the discs relatively to each other, said axle being radially connected to the other of said discs and lying in the plane thereof.

References Cited in the file of this patent

UNITED STATES PATENTS

| 888,348 | Nichols | May 19, 1908 |
|---|---|---|
| 1,065,883 | Manfull | June 24, 1913 |
| 1,244,982 | Horst | Oct. 30, 1917 |
| 1,842,713 | Case | Jan. 26, 1932 |
| 2,061,694 | Cuddigan | Nov. 24, 1936 |
| 2,308,575 | Vickery | Jan. 19, 1943 |
| 2,648,184 | Cruse | Aug. 11, 1953 |

FOREIGN PATENTS

| 395,107 | Germany | May 15, 1924 |